UNITED STATES PATENT OFFICE.

BERNHARD REMMERS, OF PHILADELPHIA, PENNSYLVANIA, ASSIGNOR, BY MESNE ASSIGNMENTS, TO ARMOUR GRAIN COMPANY, OF CHICAGO, ILLINOIS, A CORPORATION OF NEW JERSEY.

METHOD OF PREPARING PRECOOKED FOOD PRODUCTS.

1,258,047.      Specification of Letters Patent.      Patented Mar. 5, 1918.

No Drawing.      Application filed April 21, 1917. Serial No. 163,578.

*To all whom it may concern:*

Be it known that I, BERNHARD REMMERS, of Philadelphia, in the county of Philadelphia and State of Pennsylvania, have invented certain new and useful Improvements in Methods of Preparing Precooked Food Products of which the following is a specification.

This invention has reference to a method for preparing food products, and it relates particularly to a method for preparing potatoes in order that they may be preserved and kept indefinitely without discoloration or substantial change in taste or food properties, and in such condition that they may be used after a few minutes' cooking, or softening in hot water.

I accomplish the foregoing, together with such other objects as may hereinafter appear, by means of a process now to be described.

In partially preparing vegetable foods, and particularly potatoes, a number of important factors must be taken into consideration. In the first place the product in order to be salable must have a good color and a good taste. In the next place, it is important that the food properties of the particular article shall not be materially destroyed or taken away from in the process of manufacture. Again, the product must be such that it can be preserved indefinitely without change in taste, color, or food properties, and this without the use of chemical preservatives. Another item of importance, particularly where the food product is in itself expensive in its original form, is the difficulty encountered in providing an inexpensive package, which at the same time will serve to adequately preserve the food product. By my improved process, I am enabled to produce a food product which fully meets all of these difficulties.

In carrying out my process I first skin or peel the potatoes, preferably in a skinning machine, after which the eyes and defective portions are cut away by hand, both of these operations being carried on in the presence of water. By experience I have found that the color of the potatoes is much better preserved if the skinning operation be carried on in the presence of water, for the potatoes will not discolor nearly so quickly. I also attach considerable importance to the skinning of the potatoes before they are cooked, and this for two reasons. If the potatoes are cooked before peeling, serious discoloration takes place, and in addition there appears to be some chemical property or substance in that portion of the pulp of the potato next to the skin or in the skin, which produces an acrid taste in the resultant product. On either of these two grounds, the resultant product would be unsalable.

After having peeled the potatoes, I cook them, preferably by steam. When thus cooked, I have found that the potatoes lose less albumen and other valuable properties and furthermore, the potatoes will not discolor. If cooked in water there would be a large percentage of loss in food properties and the resultant product would be discolored or would discolor in a short length of time. I prefer to use steam at a pressure of about 15 pounds, with a temperature ranging from 220° to 230° F. and I cook the potatoes until they are soft, the time ranging between twenty to forty minutes depending upon the potatoes and the locality in which they are grown.

Immediately after the cooking and while the potatoes are still hot, say for example, about 200° F., I rice them, preferably in a ricing machine and discharge them in thin layers on perforated sheets, such for example as screens, so that when the screens are placed in the drier, either automatically or by hand, the heat will have access to the potatoes from substantially all sides.

After ricing, and while the thin shreds of the potatoes are still hot, I place them in a drier having a temperature of about 180° F., for a period of 25 to 30 minutes, and sometimes as long as two hours for reasons which will now be set forth. The drier consists of one or more chambers into which hot air at a temperature of about 180° F. is introduced by means of a fan, the air being introduced in the bottom of the chamber and being forced out at the top. The potatoes are thus dried by a draft of hot air and the period required for drying is dependent upon the volume of hot air passed through the drier. The air may be treated in any one of a number of different ways, as by passing it over steam coils, the only requisite being that no injurious gases be intermixed with it. The use of a flow or draft of hot air is very important in maintaining the color of the potatoes, and I have found that if heated in other ways, decided discoloration takes place.

As to preserving the color, I find that the skinning of the potatoes under water, the cooking in a closed chamber, the ricing while hot, the introduction into the drier while hot, and the use of a current of hot air for the drying, all play more or less important parts. The result is a dry, thread-like product, of good color and taste, which, without the use of any preservative, will last indefinitely, and this even though stored in ordinary pasteboard packages or cartons, through which, of course, air can find its way. Notwithstanding this, the potatoes will kep indefinitely without discoloration or loss in flavor and can be prepared for table use by the addition of water substantially equal in bulk and a few minutes' heating. When thus prepared, the food product will be found to possess a flavor and color substantially like that of freshly cooked potatoes. It will of course be apparent that the resultant product takes up a minimum of space.

I am aware that others have attempted to prepare dried potatoes, as is shown, for example, in the Edwards Patent, 4,337 of 1845. In this connection I have tried the process described by Edwards and have found the resultant product to be not only very badly discolored but also to have an acrid or bitter taste.

Dried sweet potatoes, dried carrots, and other vegetable food products can be produced by my improved process, and it is of course to be understood that the degree to which the vegetable will be divided will vary with the particular vegetable being prepared. The term ricing therefore as used in this specification is to be understood broadly.

I claim:

1. The herein described process of preparing a food product which consists in skinning potatoes; in cooking the potatoes; in forming the potatoes in relatively small particles while still at a high temperature; and finally drying said particles with a current of hot air before they are allowed to cool.

2. The herein described process of preparing a food product which consists in skinning potatoes; in cooking the potatoes; in forming the potatoes in thin elongated particles while still at a high temperature; and finally drying said particles before they are allowed to cool with a current of hot air.

3. The herein described process of preparing a food product which consists in cooking potatoes; immediately thereafter pressing said cooked material in the form of elongated particles while still at a high temperature, and finally drying said particles before they are allowed to cool.

4. The herein described process of preparing a food product which consists in cooking potatoes; immediately thereafter pressing said cooked material in the form of elongated particles while still at a high temperature, and finally drying said particles before they are allowed to cool with a current of hot air.

5. The herein described process of preparing a food product which consists in cooking potatoes; immediately thereafter pressing said cooked material in the form of elongated particles while still at a high temperature, and finally drying said particles before they are allowed to cool on a perforate member in the presence of a current of hot air.

6. The herein described process of preparing a food product which consists in skinning potatoes in the presence of water; in cooking the potatoes by steam; in ricing the cooked material while still at a high temperature; in spreading the riced material in thin layers on perforated supporting means; and in drying the particles before they are allowed to cool in a current of hot air.

7. The herein described process of preparing potatoes which consists in cooking potatoes at a temperature of about 220° F.; in ricing the cooked material while still at a high temperature; and finally in drying the particles at a temperature of about 180° F.

8. The herein described process of preparing a food product which consists in skinning potatoes; in cooking the potatoes in steam at a temperature of 220° F.; and immediately thereafter ricing the cooked material while still at a high temperature; in spreading the material in thin layers on perforate supporting means; and in drying the particles with a current of hot air at about 180° F.

In testimony whereof I have hereunto signed my name.

BERNHARD REMMERS.